(12) United States Patent
Chen

(10) Patent No.: US 9,030,761 B2
(45) Date of Patent: May 12, 2015

(54) IMAGING LENS ASSEMBLY

(71) Applicant: Largan Precision Co., Ltd., Taichung (TW)

(72) Inventor: Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 142 days.

(21) Appl. No.: 13/935,481

(22) Filed: Jul. 3, 2013

(65) Prior Publication Data

US 2015/0002727 A1    Jan. 1, 2015

(30) Foreign Application Priority Data

Jun. 26, 2013    (TW) .............................. 102122740 A

(51) Int. Cl.
*G02B 13/18* (2006.01)
*G02B 9/12* (2006.01)
*H04N 5/225* (2006.01)
*G02B 13/00* (2006.01)

(52) U.S. Cl.
CPC ................ *G02B 9/12* (2013.01); *H04N 5/2254* (2013.01); *G02B 13/002* (2013.01); *G02B 13/005* (2013.01)

(58) Field of Classification Search
CPC .............. G02B 9/00; G02B 9/12; G02B 9/16; G02B 9/32; G02B 13/00; G02B 13/0015; G02B 13/002; G02B 13/0035
USPC ......... 359/716, 745, 748, 749, 753, 754, 784, 359/791
See application file for complete search history.

(56) References Cited

U.S. PATENT DOCUMENTS

| | | | | |
|---|---|---|---|---|
| 6,795,253 | B2 * | 9/2004 | Shinohara | 359/716 |
| 6,804,067 | B2 * | 10/2004 | Sato | 359/784 |
| 6,989,947 | B2 | 1/2006 | Do | |
| 7,167,323 | B2 | 1/2007 | Isono | |
| 7,400,454 | B2 | 7/2008 | Kubota et al. | |
| 7,450,323 | B2 * | 11/2008 | Nakamura | 359/784 |
| 8,331,036 | B2 | 12/2012 | Tang et al. | |
| 8,345,359 | B1 | 1/2013 | Liang | |
| 2009/0291551 | A1 * | 11/2009 | Cho | 438/585 |
| 2010/0328518 | A1 * | 12/2010 | Iba et al. | 348/340 |
| 2014/0071522 | A1 | 3/2014 | Hsu et al. | |

FOREIGN PATENT DOCUMENTS

| | | |
|---|---|---|
| JP | 2005-284110 A | 10/2005 |
| JP | 2006-301221 A | 11/2006 |
| JP | 2010-145648 A | 7/2010 |
| JP | 2013-008053 A | 1/2013 |

* cited by examiner

*Primary Examiner* — Thong Nguyen
(74) *Attorney, Agent, or Firm* — CKC & Partners Co., Ltd.

(57) ABSTRACT

An imaging lens assembly includes, in order from an object side to an image side, a first lens element, a second lens element and a third lens element. The first lens element with positive refractive power has an object-side surface being convex in a paraxial region thereof. The second lens element with refractive power has an object-side surface being concave in a paraxial region thereof and an image-side surface being convex in a paraxial region thereof. The third lens element with refractive power has an image-side surface being concave in a paraxial region thereof, wherein the image-side surface of the third lens element has at least one convex shape in an off-axis region thereof, and both of an object-side surface and the image-side surface are aspheric. The imaging lens assembly has a total of three lens elements with refractive power.

20 Claims, 12 Drawing Sheets

IMAGING LENS ASSEMBLY

RELATED APPLICATIONS

This application claims priority to Taiwan Application Serial Number 102122740, filed Jun. 26, 2013, which is herein incorporated by reference.

BACKGROUND

1. Technical Field

The present disclosure relates to an imaging lens assembly. More particularly, the present disclosure relates to a miniaturized imaging lens assembly applicable to electronic products.

2. Description of Related Art

In recent years, with the popularity of mobile products having camera functionalities, a demand for optical system is increasing. A photosensitive sensor of a conventional optical system is typically a CCD (Charge-Coupled Device) or a CMOS (Complementary Metal-Oxide-Semiconductor) sensor. As the advanced semiconductor manufacturing technologies have allowed a pixel size of sensors to be reduced and the optical systems have gradually evolved toward a field of higher megapixels, there is an increasing demand for better image quality.

A conventional optical system employed in a portable electronic product, mainly adopts a structure of two lens elements so as to save costs. However, this is not favorable for correcting the aberration with only two lens elements which cannot satisfy the optical systems with high-end specifications. Moreover, the four-element lens structure is not favorable for keeping the optical system compact since the number of lens elements is too much. The cost and complexity in assembling lens elements are also comparatively higher.

Although conventional optical system with three lens elements do not only equip with better image quality but also a compact size, the Abbe numbers of the first lens element and the second lens element cannot focus the wavelengths of the visible spectrum at different focal point.

SUMMARY

According to one aspect of the present disclosure, an imaging lens assembly includes, in order from an object side to an image side, a first lens element, a second lens element and a third lens element. The first lens element with positive refractive power has an object-side surface being convex in a paraxial region thereof. The second lens element with refractive power has an object-side surface being concave in a paraxial region thereof and an image-side surface being convex in a paraxial region thereof. The third lens element with refractive power has an image-side surface being concave in a paraxial region thereof, wherein the image-side surface of the third lens element has at least one convex shape in an off-axis region thereof, and both of an object-side surface and the image-side surface are aspheric. The imaging lens assembly has a total of three lens elements with refractive power. When an Abbe number of the first lens element is V1, an Abbe number of the second lens element is V2, a focal length of the first lens element is f1, a focal length of the second lens element is f2, an axial distance between the first lens element and the second lens element is T12, and an axial distance between the second lens element and the third lens element is T23, the following relationships are satisfied:

$-4.0<(V1+V2)/(V1-V2)<-1.5;$ $0<T12/T23\leq 3.0;$ and $0<|f1/f2|<0.9.$

According to another aspect of the present disclosure, an image capturing device includes the imaging lens assembly according to the aspect and an image sensor. The image sensor is located on an image plane side of the imaging lens assembly.

According to still another aspect of the present disclosure, an imaging lens assembly includes, in order from an object side to an image side, a first lens element, a second lens element and a third lens element. The first lens element with positive refractive power has an object-side surface being convex in a paraxial region thereof. The second lens element with refractive power has an object-side surface being concave in a paraxial region thereof and an image-side surface being convex in a paraxial region thereof. The third lens element with refractive power has an image-side surface being concave in a paraxial region thereof, wherein the image-side surface of the third lens element has at least one convex shape in an off-axis region thereof, and both of an object-side surface and the image-side surface are aspheric. The imaging lens assembly has a total of three lens elements with refractive power. The imaging lens assembly further includes a stop located between an imaged object and the first lens element. When an Abbe number of the first lens element is V1, an Abbe number of the second lens element is V2, an axial distance between the first lens element and the second lens element is T12, an axial distance between the second lens element and the third lens element is T23, a focal length of the first lens element is f1, a focal length of the second lens element is f2, an axial distance between the stop and an image plane is SL, and an axial distance between the object-side surface of the first lens element and the image plane is TTL, the following relationships are satisfied:

$-4.0<(V1+V2)/(V1-V2)<-1.5;$ $0<T12/T23<4.5;$ $0<|f1/f2|<0.9;$ and $0.90<SL/TTL<1.10.$

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
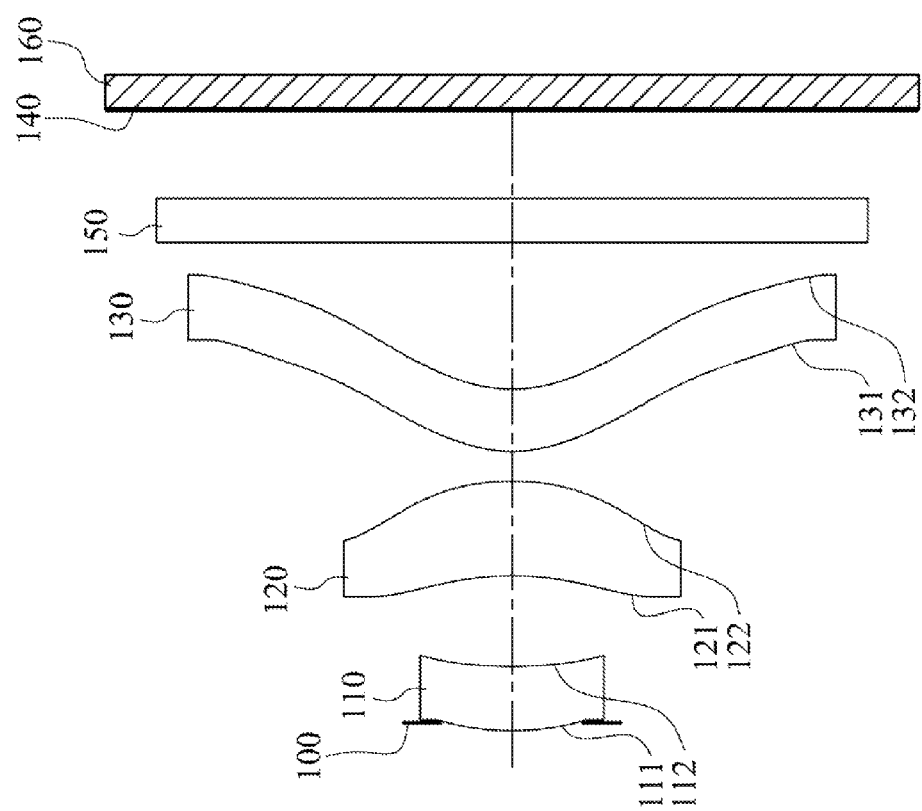
FIG. 1 is a schematic view of an imaging lens assembly according to the 1st embodiment of the present disclosure.

An imaging lens assembly includes, in order from an object side to an image side, a first lens element, a second lens element and a third lens element. The imaging lens assembly has a total of three lens elements with refractive power and further includes an image sensor located on an image plane side. More specifically, the image sensor can be located on an image plane.

The first lens element with positive refractive power has an object-side surface being convex in a paraxial region thereof and can have an image-side surface being concave in a paraxial region thereof. Therefore, it is favorable for reducing the total track length of the imaging lens assembly by properly adjusting the positive refractive power of the first lens element.

The second lens element can have negative refractive power and has an object-side surface being concave in a paraxial region thereof and an image-side surface being convex in a paraxial region thereof. Moreover, at least one of the object-side surface and the image-side surface of the second lens element has at least one inflection point. Therefore, it is favorable for correcting the aberration generated by the first lens element and reducing the incident angle of the off-axis on the image plane so as to increase the responding rate of an image sensor.

The third lens element can have negative refractive power, an object-side surface being convex in a paraxial region thereof and an image-side surface being concave in a paraxial region thereof, wherein the image-side surface of the third lens element has at least one convex shape in an off-axis region thereof. Therefore, it is favorable for the principal point of the imaging lens assembly being positioned away from the image plane. Moreover, it is also favorable for effectively correcting the aberration of the off-axis.

When an Abbe number of the first lens element is V1, and an Abbe number of the second lens element is V2, the following relationship is satisfied: $-4.0 < (V1+V2)/(V1-V2) < -1.5$. Therefore, it is favorable for adjusting every wavelength of the visible spectrum so as to focus at different focal points. Preferably, the following relationship is satisfied: $-3.0 < (V1+V2)/(V1-V2) < -1.5$.

When an axial distance between the first lens element and the second lens element is T12, and an axial distance between the second lens element and the third lens element is T23, the following relationship is satisfied: $0 < T12/T23 < 4.5$. Therefore, it is favorable for assembling the lens elements and reducing the total track length so as to keep the imaging lens assembly compact. Preferably, the following relationship is satisfied: $0 < T12/T23 < 3.5$. More preferably, the following relationship is satisfied: $0 < T12/T23 \leq 3.0$.

When a focal length of the first lens element is f1, and a focal length of the second lens element is f2, the following relationship is satisfied: $0 < |f1/f2| < 0.9$. Therefore, it is favorable for correcting the aberration. Preferably, the following relationship is satisfied: $0 < |f1/f2| < 0.5$. More preferably, the following relationship is satisfied: $0.1 < |f1/f2| < 0.5$.

The aforementioned imaging lens assembly further includes a stop, such as an aperture stop, which is disposed between an imaged object and the first lens element, wherein an axial distance between the stop and an image plane is SL, and an axial distance between the object-side surface of the first lens element and the image plane is TTL, the following relationship is satisfied: $0.90 < SL/TTL < 1.10$. Therefore, it is favorable for making a balance between the telecentric and ide-angle qualities so as to keep a proper total track length for the imaging lens assembly.

When a focal length of the imaging lens assembly is f, the focal length of the first lens element is f1, the focal length of the second lens element is f2, and a focal length of the third lens element is f3, the following relationship is satisfied: $1.0 < \Sigma|f/fx| < 2.0$, where x=1, 2, and 3. Therefore, it is favorable for balancing the refractive powers of the imaging lens assembly and correcting the aberration.

When a curvature radius of the object-side surface of the first lens element is R1, and a curvature radius of the image-side surface of the first lens element is R2, the following relationship is satisfied: $-4.0 < (R1+R2)/(R1-R2) < 0$. Therefore, it is favorable for reducing the spherical aberration and astigmatism.

When the focal length of the imaging lens assembly is f, and the focal length of the third lens element is f3, the following relationship is satisfied: $-0.25 < f/f3 < 0$. Therefore, it is favorable for reducing the back focal length of the imaging lens assembly so as to keep the imaging lens assembly compact.

According to the imaging lens assembly of the present disclosure, an aperture stop can be configured as a front stop or a middle stop. A front stop disposed between an imaged object and a first lens element can provide a longer distance between an exit pupil of the assembly and an image plane and which improves the image-sensing efficiency of an image sensor. A middle stop disposed between the first lens element and an image plane is favorable for enlarging the field of view of the assembly and thereby provides a wider field of view for the same.

According to the imaging lens assembly of the present disclosure, the lens elements can be made of plastic or glass material. When the lens elements are made of glass material, the distribution of the refractive power of the imaging lens assembly can be more flexible to design. When the lens elements are made of plastic material, the manufacturing cost thereof can be decreased. Furthermore, surfaces of each lens element can be arranged to be aspheric, because the aspheric surface of the lens element is easy to form a shape other than spherical surface so as to have more controllable variables for eliminating the aberration thereof, and to further decrease the required number of the lens elements. Thus, the total track length of the imaging lens assembly can be effectively reduced.

According to the imaging lens assembly of the present disclosure, the imaging lens assembly can include at least one stop for eliminating the stray light and thereby improving the image resolution thereof.

According to the imaging lens assembly of the present disclosure, each of an object-side surface and an image-side surface of every lens element has a paraxial region thereof and an off-axis region thereof. The paraxial region thereof refers to the region of the surface where light rays travel close to an optical axis and the off-axis region thereof refers to the region of the surface where light rays travel away from the optical axis. Particularly, when the lens element has a convex surface, it indicates that the surface is convex in a paraxial region thereof; and when the lens element has a concave surface, it indicates that the surface is concave in a paraxial region thereof.

According to the imaging lens assembly of the present disclosure, the imaging lens assembly is featured with good correction ability and high image quality, and can be applied to 3D (three-dimensional) image capturing applications, in products such as digital cameras, mobile devices and tablets.

According to the present disclosure, an image capturing device is provided. The image capturing device includes the imaging lens assembly according to the aforementioned imaging lens assembly of the present disclosure, and an image sensor located on an image plane side of the imaging lens assembly. Therefore, the image capturing device is favorable for improving image quality by adjusting every wavelength of the visible spectrum so as to focus at different focal points.

According to the above description of the present disclosure, the following 1st-6th specific embodiments are provided for further explanation.

1st Embodiment

Figure 2:
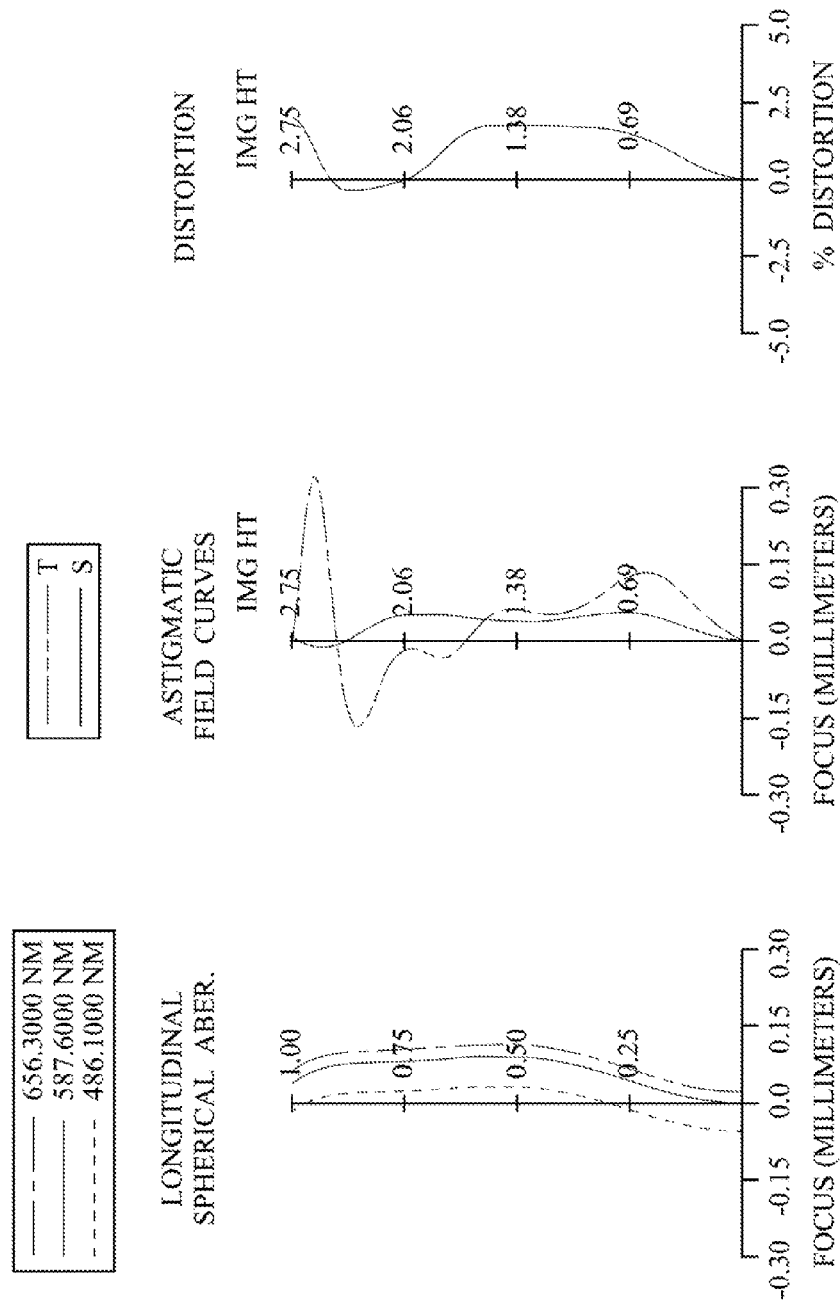
FIG. 2 shows, in order from left to right, spherical aberration curves, astigmatic field curves and a distortion curve of the imaging lens assembly according to the 1st embodiment.

FIG. 1 is a schematic view of an imaging lens assembly according to the 1st embodiment of the present disclosure. FIG. 2 shows, in order from left to right, spherical aberration curves, astigmatic field curves and a distortion curve of the imaging lens assembly according to the 1st embodiment.

In FIG. 1, the imaging lens assembly includes, in order from an object side to an image side, an aperture stop 100, a first lens element 110, a second lens element 120, a third lens element 130, an IR-cut filter 150, an image plane 140 and an image sensor 160, wherein the imaging lens assembly has a total of three lens elements (110-130) with refractive power.

The first lens element 110 with positive refractive power has an object-side surface 111 being convex in a paraxial region thereof and an image-side surface 112 being concave in a paraxial region thereof, which are both aspheric, and the first lens element 110 is made of plastic material.

The second lens element 120 with positive refractive power has an object-side surface 121 being concave in a paraxial region thereof and an image-side surface 122 being convex in a paraxial region thereof, which are both aspheric, and the second lens element 120 is made of plastic material. Moreover, both of the object-side surface 121 and the image-side surface 122 of the second lens element 120 have at least one inflection point.

The third lens element 130 with positive refractive power has an object-side surface 131 being convex in a paraxial region thereof and an image-side surface 132 being concave in a paraxial region thereof, which are both aspheric, and the third lens element 130 is made of plastic material. Moreover, the image-side surface 132 of the third lens element 130 has at least one convex shape in an off-axis region thereof.

The IR-cut filter 150 is made of glass and located between the third lens element 130 and the image plane 140, and will not affect the focal length of the imaging lens assembly.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i)$$

wherein,

X is the relative distance between a point on the aspheric surface spaced at a distance Y from the optical axis and the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the imaging lens assembly according to the 1st embodiment, when a focal length of the imaging lens assembly is f, an f-number of the imaging lens assembly is Fno, and half of the maximal field of view of the imaging lens assembly is HFOV, these parameters have the following values: f=2.91 mm; Fno=3.00; and HFOV=42.6 degrees.

In the imaging lens assembly according to the 1st embodiment, when an Abbe number of the first lens element 110 is V1, and an Abbe number of the second lens element 120 is V2, the following relationship is satisfied: (V1+V2)/(V1−V2)=−2.76.

In the imaging lens assembly according to the 1st embodiment, when an axial distance between the first lens element 110 and the second lens element 120 is T12, and an axial distance between the second lens element 120 and the third lens element 130 is T23, the following relationship is satisfied: T12/T23=3.00.

In the imaging lens assembly according to the 1st embodiment, when a curvature radius of the object-side surface 111 of the first lens element 110 is R1, and a curvature radius of the image-side surface 112 of the first lens element 110 is R2, the following relationship is satisfied: (R1+R2)/(R1−R2)=−3.34.

In the imaging lens assembly according to the 1st embodiment, when a focal length of the first lens element 110 is f1, and a focal length of the second lens element 120 is f2, the following relationship is satisfied: |f1/f2|=0.39.

In the imaging lens assembly according to the 1st embodiment, when the focal length of the imaging lens assembly is f, and a focal length of the third lens element 130 is f3, the following relationship is satisfied: f/f3=0.41.

In the imaging lens assembly according to the 1st embodiment, when the focal length of the imaging lens assembly is f, the focal length of the first lens element 110 is f1, the focal length of the second lens element 120 is f2, and the focal length of the third lens element 130 is f3, the following relationship is satisfied: Σ|f/fx|=1.11

In the imaging lens assembly according to the 1st embodiment, the aperture stop 110 is disposed between an imaged object and the first lens element 110, wherein an axial distance between the aperture stop 100 and the image plane 140 is SL, and an axial distance between the object-side surface 111 of the first lens element 110 and the image plane 140 is TTL, the following relationship is satisfied: SL/TTL=0.99.

The detailed optical data of the 1st embodiment are shown in Table 1 and the aspheric surface data are shown in Table 2 below.

TABLE 1

Embodiment 1
f = 2.91 mm, Fno = 3.00, HFOV = 42.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.054 | | | | |
| 2 | Lens 1 | 1.805 | ASP | 0.437 | Plastic | 1.607 | 26.6 | 5.82 |
| 3 | | 3.351 | ASP | 0.614 | | | | |
| 4 | Lens 2 | −1.899 | ASP | 0.641 | Plastic | 1.514 | 56.8 | 14.76 |
| 5 | | −1.692 | ASP | 0.205 | | | | |
| 6 | Lens 3 | 0.916 | ASP | 0.420 | Plastic | 1.535 | 55.7 | 7.12 |
| 7 | | 1.014 | ASP | 1.000 | | | | |
| 8 | IR-cut filter | Plano | | 0.300 | Glass | 1.517 | 64.2 | — |
| 9 | | Plano | | 0.600 | | | | |
| 10 | Image | Plano | | — | | | | |

Note:
Reference wavelength is 587.6 nm (d-line).

TABLE 2

Aspheric Coefficients

| | Surface # | | |
|---|---|---|---|
| | 2 | 3 | 4 |
| k = | 1.8790E−01 | −6.8864E−03 | −5.6265E−01 |
| A4 = | −7.4132E−02 | 1.0594E−01 | 6.5250E−03 |
| A6 = | 1.4339E+00 | −2.4954E−03 | 4.0087E−01 |
| A8 = | −7.6675E+00 | 4.0174E−01 | −8.0640E−01 |
| A10 = | 1.8005E+01 | −1.3885E+00 | 8.8293E−01 |
| A12 = | −1.4389E+01 | 1.1692E+00 | −3.5663E−01 |

| | Surface # | | |
|---|---|---|---|
| | 5 | 6 | 7 |
| k = | 4.6592E−01 | −4.4868E+00 | −1.6414E+00 |
| A4 = | −2.6429E−01 | 1.4944E−01 | −8.1503E−03 |
| A6 = | 5.5619E−01 | −1.5099E−01 | −5.1567E−02 |
| A8 = | −5.7479E−01 | 5.5919E−02 | 2.1324E−02 |
| A10 = | 3.7058E−01 | −9.1491E−03 | −3.2691E−03 |
| A12 = | −8.7804E−02 | 5.4667E−04 | 1.7140E−04 |

In Table 1, the curvature radius, the thickness and the focal length ere shown in millimeters (mm). Surface numbers 0-10 represent the surfaces sequentially arranged from the object-side to the image-side along the optical axis. In Table 2, k represents the conic coefficient of the equation of the aspheric surface profiles. A1-A12 represent the aspheric coefficients ranging from the 1st order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
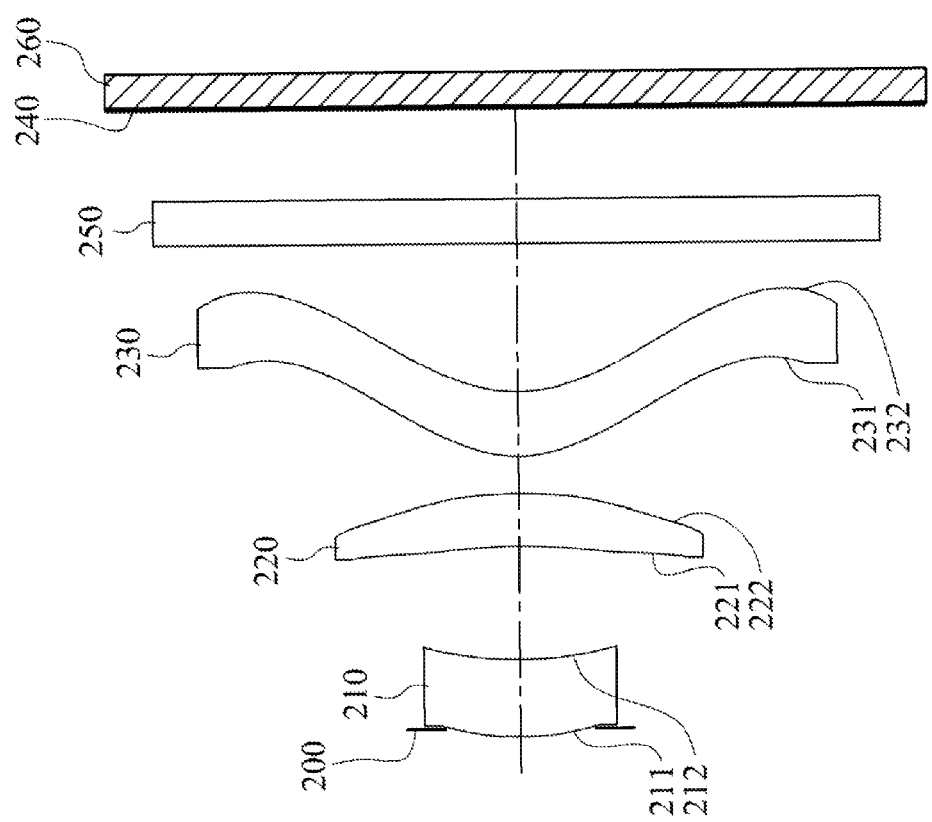
FIG. 3 is a schematic view of an imaging lens assembly according to the 2nd embodiment of the present disclosure.

FIG. 3 is a schematic view of an imaging lens assembly according to the 2nd embodiment of the present disclosure.

Figure 4:
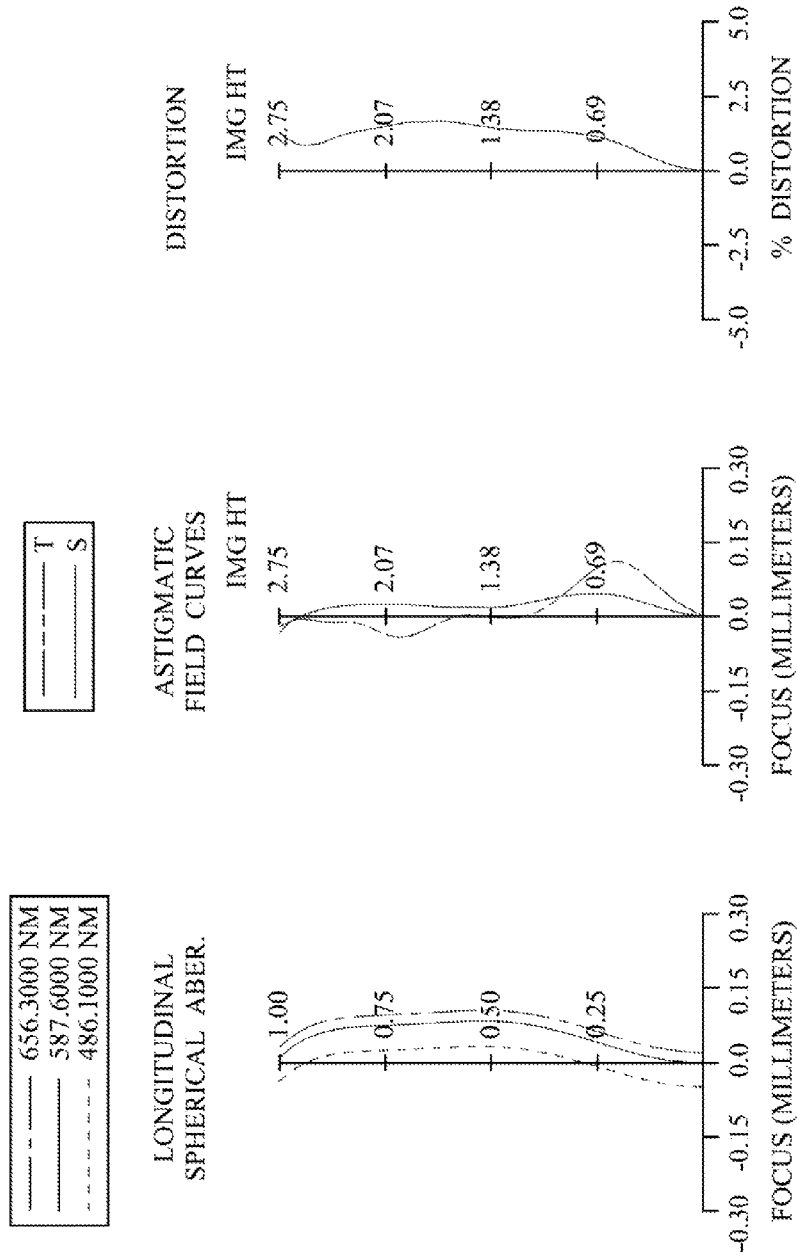
FIG. 4 shows, in order from left to right, spherical aberration curs astigmatic field curves and a distortion curve of the imaging lens assembly according to the 2nd embodiment.

FIG. 4 shows, in order from left to right, spherical aberration curves, astigmatic field curves and a distortion curve of the imaging lens assembly according to the 2nd embodiment.

In FIG. 3, the imaging lens assembly includes, in order from an object side to an mage side, an aperture stop 200, a first lens element 210, a second lens element 220, a third lens element 230, an IR-cut filter 250, an image plane 240 and an image sensor 260, wherein the imaging lens assembly has a total of three lens elements (210-230) with refractive power.

The first lens element 210 with positive refractive power has an object-side surface 211 being convex in a paraxial region thereof and an image-side surface 212 being concave in a paraxial region thereof, which are both aspheric, and the first lens element 210 is made of glass material.

The second lens element 220 with negative refractive power has an object-side surface 221 being concave in a paraxial region thereof and an image-side surface 222 being convex in a paraxial region thereof, which are both aspheric, and the second lens element 220 is made of plastic material. Moreover, the object-side surface 221 of the second lens element 220 has at least one inflection point.

The third lens element 230 with positive refractive power has an object-side surface 231 being convex in a paraxial region thereof and an image-side surface 232 being concave in a paraxial region thereof, which are both aspheric and the third lens element 230 is made of plastic material. Moreover, the image-side surface 232 of the third lens element 230 has at least one convex shape in an off-axis region thereof.

The IR-cut filter 250 is made of glass and located between the third lens element 230 and the image plane 240, and will not affect the focal length of the imaging lens assembly.

The detailed optical data of the 2nd embodiment are shown in Table 3 and the aspheric surface data are shown in Table 4 below.

TABLE 3

2nd Embodiment
f = 3.16 mm, Fno = 3.12, HFOV = 40.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.055 | | | | |

TABLE 3-continued

2nd Embodiment
f = 3.16 mm, Fno = 3.12, HFOV = 40.5 deg.

| Surface # | | Curvature Radius | | Thickness | Material | Index | Abbe # | Focal Length |
|---|---|---|---|---|---|---|---|---|
| 2 | Lens 1 | 1.852 | ASP | 0.521 | Glass | 1.693 | 33.7 | 6.72 |
| 3 | | 2.719 | ASP | 0.762 | | | | |
| 4 | Lens 2 | −3.645 | ASP | 0.350 | Plastic | 1.514 | 56.8 | −42.56 |
| 5 | | −4.516 | ASP | 0.254 | | | | |
| 6 | Lens 3 | 0.813 | ASP | 0.433 | Plastic | 1.535 | 55.7 | 4.27 |
| 7 | | 1.027 | ASP | 1.000 | | | | |
| 8 | IR-cut filter | Plano | | 0.300 | Glass | 1.517 | 64.2 | — |
| 9 | | Plano | | 0.618 | | | | |
| 10 | Image | Plano | | — | | | | |

Note:
Reference wavelength is 587.6 nm (d-line).

TABLE 4

Aspheric Coefficients

| | Surface # | | |
|---|---|---|---|
| | 2 | 3 | 4 |
| k = | −9.0188E−01 | 4.5981E+00 | 1.4994E+00 |
| A4 = | −4.2278E−02 | 3.4524E−02 | 3.6911E−02 |
| A6 = | 9.2750E−01 | −8.3971E−02 | 3.1918E−01 |
| A8 = | −5.0579E+00 | 2.0370E−02 | −5.7959E−01 |
| A10 = | 1.1980E+01 | 4.6109E−02 | 4.3179E−01 |
| A12 = | −9.6876E+00 | 7.1763E−02 | −1.2595E−01 |

| | Surface # | | |
|---|---|---|---|
| | 5 | 6 | 7 |
| k = | 3.3576E+00 | −3.6772E+00 | −1.2400E+00 |
| A4 = | −4.2633E−01 | 9.7693E−02 | −6.6071E−02 |
| A6 = | 8.6566E−01 | −9.8964E−02 | −1.5953E−02 |
| A8 = | −8.4257E−01 | 3.6012E−02 | 1.0381E−02 |
| A10 = | 4.2929E−01 | −6.7022E−03 | −2.1259E−03 |
| A12 = | −9.1990E−02 | 4.9719E−04 | 1.4974E−04 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard ill not be provided again.

Moreover, these parameters can be calculated from Table 3 and Table 4 as the following values and satisfy the following relationships:

| 2nd Embodiment | | | |
|---|---|---|---|
| f [mm] | 3.16 | (R1 + R2)/(R1 − R2) | −5.27 |
| Fno | 3.12 | \|f1/f2\| | 0.16 |
| HFOV [deg.] | 40.5 | f/f3 | 0.74 |
| (V1 + V2)/(V1 − V2) | −3.92 | Σ\|f/fx\| | 1.28 |
| T12/T23 | 3.00 | SL/TTL | 0.99 |

3rd Embodiment

Figure 5:
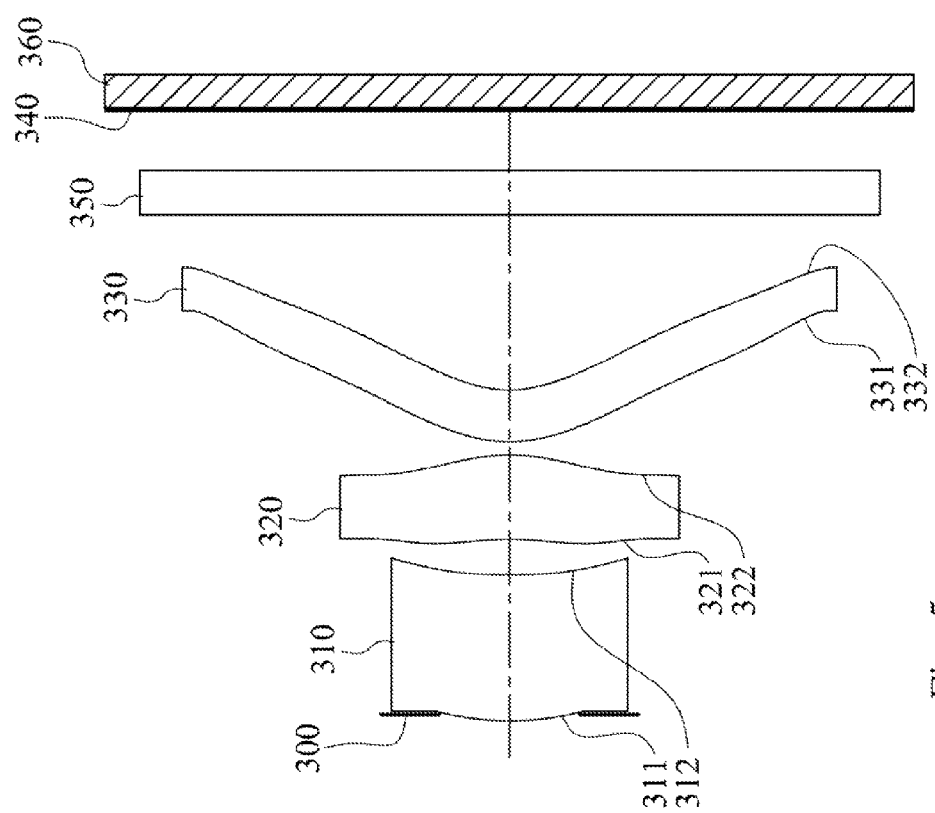
FIG. 5 is a schematic view of an imaging lens assembly according to the 3rd embodiment of the present disclosure.
Figure 6:
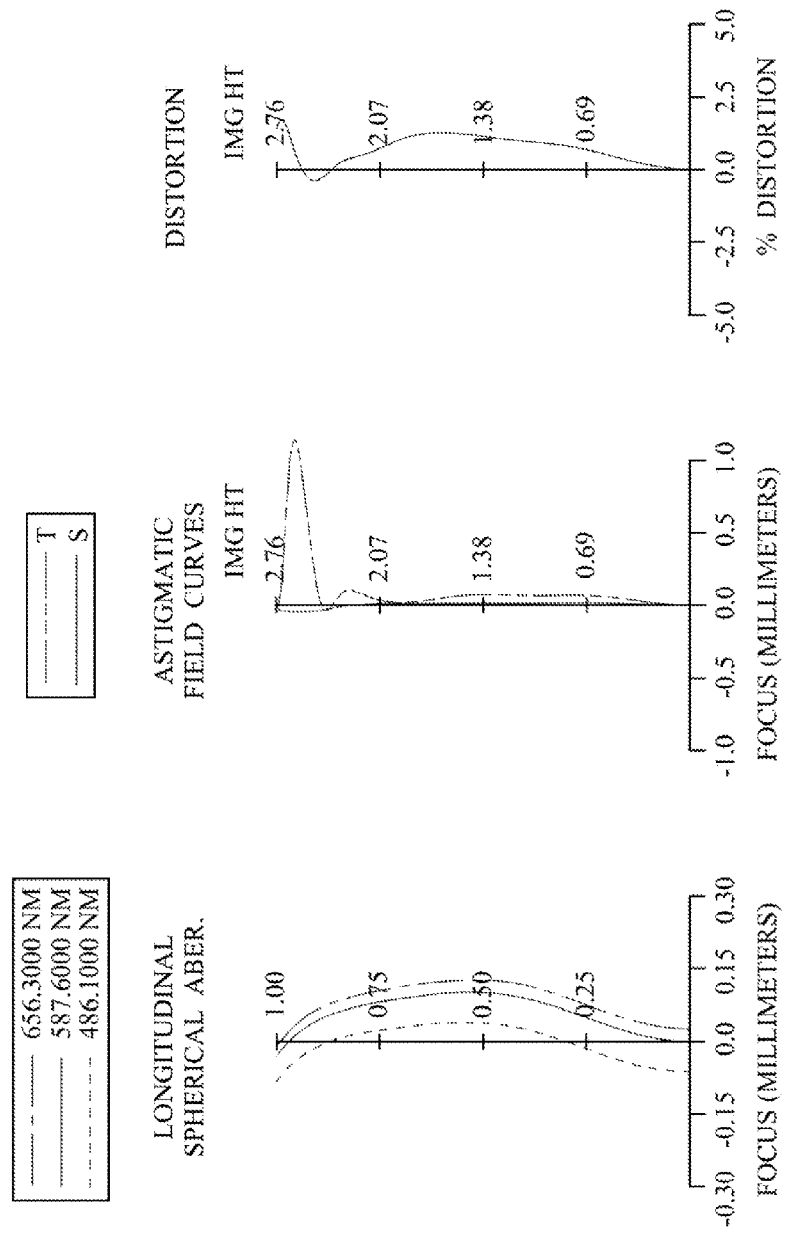
FIG. 6 shows, in order from left to right, spherical aberration curves, astigmatic field curves and a distortion curve of the imaging lens assembly according to the 3rd embodiment.

FIG. 5 is a schematic view of an imaging lens assembly according to the 3rd embodiment of the present disclosure. FIG. 6 shows, in order from left to right, spherical aberration curves, astigmatic field curves and a distortion curve of the imaging lens assembly according to the 3rd embodiment.

In FIG. 5, the imaging lens assembly includes, in order from an object side to an image side, an aperture stop 300, a first lens element 310, a second lens element 320, a third lens element 330, an IR-cut filter 350, an image plane 340 and an image sensor 360, wherein the imaging lens assembly has a total of three lens elements (310-330) with refractive power.

The first lens element 310 with positive refractive power has an object-side surface 311 being convex in a paraxial region thereof and an image-side surface 312 being concave in a paraxial region thereof, which are both aspheric, and the first lens element 310 is made of plastic material.

The second lens element 320 with positive refractive power has an object-side surface 321 being concave in a paraxial region thereof and an image-side surface 322 being convex in a paraxial region thereof, which are both aspheric, and the second lens element 320 is made of plastic material. Moreover, the object-side surface 321 of the second lens element 320 has at its least one inflection point.

The third lens element 330 with negative refractive power has an object-side surface 331 being convex in a paraxial region thereof and an image-side surface 332 being concave in a paraxial region thereof, which are both aspheric, and the third lens element 330 is made of plastic material. Moreover, the image-side surface 332 of the third lens element 330 has at least one convex shape in an off-axis region thereof.

The IR-cut filter 350 is made of glass and located between the third lens element 330 and the image plane 340, and will not affect the focal length of the imaging lens assembly.

The detailed optical data of the 3rd embodiment are shown in Table 5 and the aspheric surface data are shown in Table 6 below.

TABLE 5

3rd Embodiment
f = 3.07 mm, Fno = 3.20, HFOV = 41.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.043 | | | | |
| 2 | Lens 1 | 1.947 | ASP | 0.994 | Plastic | 1.607 | 26.6 | 4.88 |
| 3 | | 4.571 | ASP | 0.246 | | | | |
| 4 | Lens 2 | −1.785 | ASP | 0.575 | Plastic | 1.544 | 55.9 | 5.52 |
| 5 | | −1.247 | ASP | 0.090 | | | | |
| 6 | Lens 3 | 0.973 | ASP | 0.350 | Plastic | 1.535 | 55.7 | −24.34 |
| 7 | | 0.792 | ASP | 1.200 | | | | |
| 8 | IR-cut filter | Plano | | 0.300 | Glass | 1.517 | 64.2 | — |
| 9 | | Plano | | 0.419 | | | | |
| 10 | Image | Plano | | — | | | | |

Note:
Reference wavelength is 587.6 nm (d-line).

TABLE 6

Aspheric Coefficients

| | Surface # | | |
|---|---|---|---|
| | 2 | 3 | 4 |
| k = | −1.2689E+00 | 9.0875E−01 | −1.7506E+01 |
| A4 = | −9.1085E−02 | 4.7385E−01 | 4.8269E−01 |
| A6 = | 1.3762E+00 | −1.7302E+00 | 1.3122E−01 |
| A8 = | −8.7212E+00 | 4.9195E+00 | −2.8507E+00 |
| A10 = | 2.5701E+01 | −1.1181E+01 | 7.1847E+00 |
| A12 = | −3.5436E+01 | 1.7645E+01 | −9.4427E+00 |
| A14 = | 3.2095E+01 | −1.6183E+01 | 6.5442E+00 |
| A16 = | −2.2280E+01 | 6.3018E+00 | −1.9115E+00 |

| | Surface # | | |
|---|---|---|---|
| | 5 | 6 | 7 |
| k = | −2.3104E−01 | −1.7532E+00 | −3.1769E+00 |
| A4 = | 4.4701E−01 | −1.2780E−01 | −1.9919E−02 |
| A6 = | −1.8062E−01 | 4.8297E−02 | −1.9048E−02 |
| A8 = | 1.8746E−02 | −9.7496E−03 | 1.4407E−02 |
| A10 = | 2.5299E−01 | 9.5767E−04 | −4.8822E−03 |
| A12 = | −3.6330E−01 | 1.4877E−04 | 1.0623E−03 |
| A14 = | 1.8590E−01 | −5.8714E−05 | −1.3584E−04 |
| A16 = | −3.1598E−02 | 4.6970E−06 | 7.1404E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following relationships:

| 3rd Embodiment | | | |
|---|---|---|---|
| f [mm] | 3.07 | (R1 + R2)/(R1 − R2) | −2.48 |
| Fno | 3.20 | |f1/f2| | 0.88 |
| HFOV [deg.] | 41.3 | f/f3 | −0.13 |
| (V1 + V2)/(V1 − V2) | −2.82 | Σ|f/fx| | 1.31 |
| T12/T23 | 2.73 | SL/TTL | 0.99 |

4th Embodiment

Figure 7:
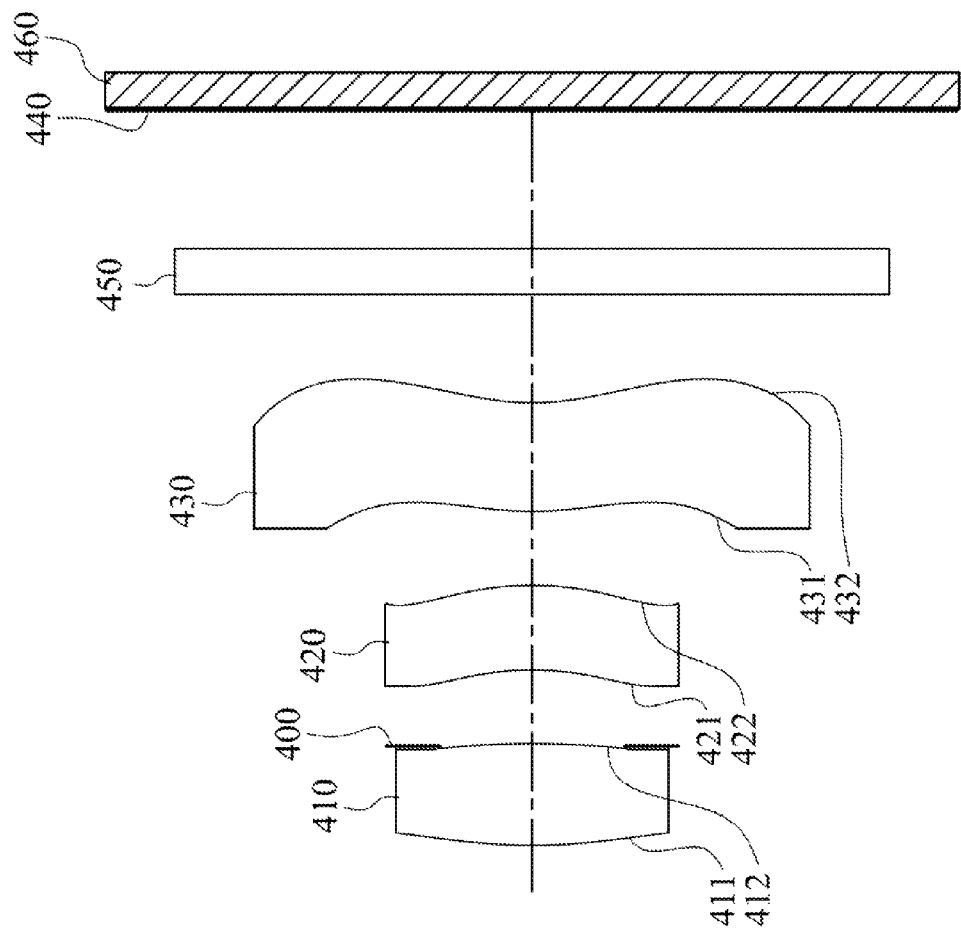
FIG. 7 is a schematic view of an imaging lens assembly according to the 4th embodiment of the present disclosure.
Figure 8:
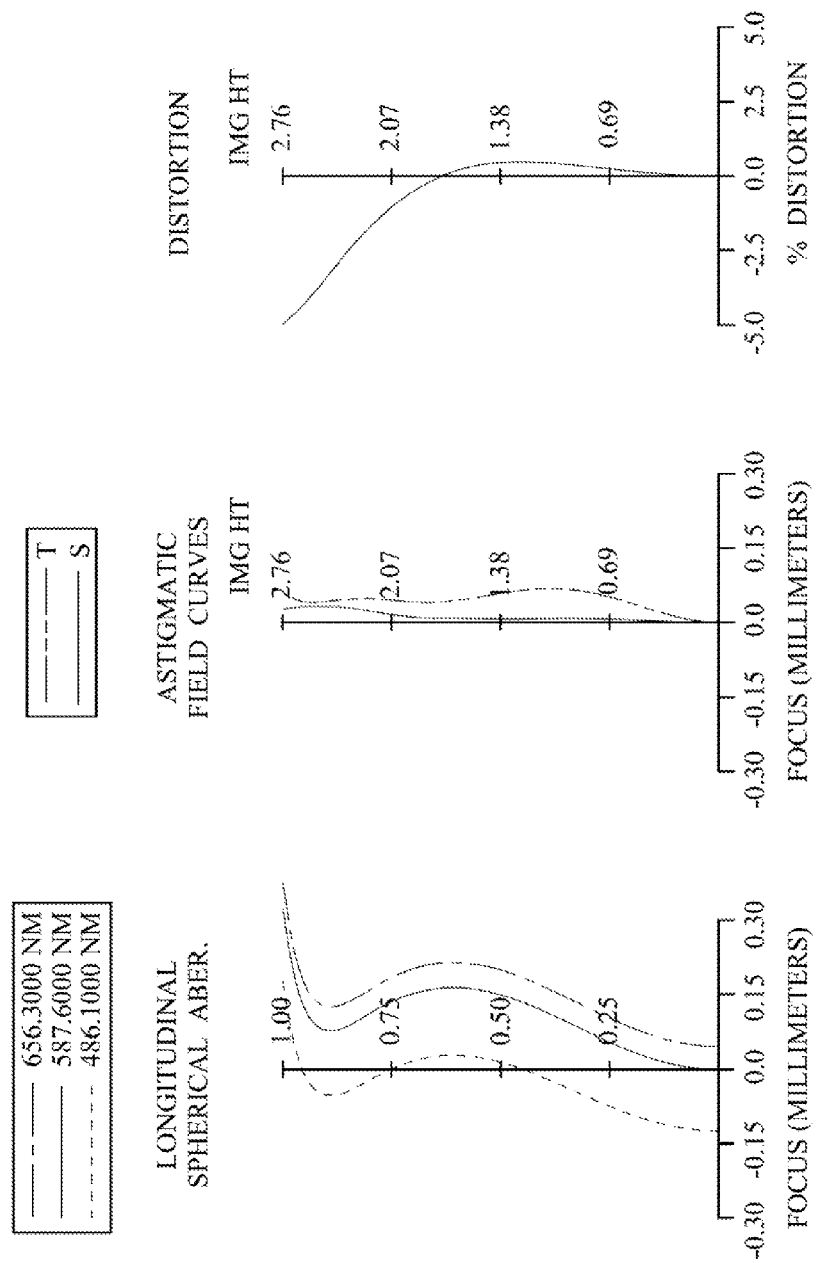
FIG. 8 shows, in order from left to right, spherical aberration curves, astigmatic field curves and a distortion curve of the imaging lens assembly according to the 4th embodiment.

FIG. 7 is a schematic view of an imaging lens assembly according to the 4th embodiment of the present disclosure. FIG. 8 shows, in order from left to right, spherical aberration curves, astigmatic field curves and a distortion curve of the imaging lens assembly according to the 4th embodiment.

In FIG. 7, the imaging lens assembly includes, in order from an object side to an image side, a first lens element 410, an aperture stop 400, a second lens element 420, a third lens element 430, an IR-cut filter 450, an image plane 440 and an image sensor 460, wherein the imaging lens assembly has a total of three lens elements (410-430) with refractive power.

The first lens element 410 with positive refractive power has an object-side surface 411 being convex in a paraxial region thereof and an image-side surface 412 being convex in a paraxial region thereof, which are both aspheric, and the first lens element 410 is made of plastic material.

The second lens element 420 with negative refractive power has an object-side surface 421 being concave in a paraxial region thereof and an image-side surface 422 being convex in a paraxial region thereof, which are both aspheric, and the second lens element 420 is made of plastic material. Moreover, both of the object-side surface 421 and the image-side surface 422 of the second lens element 420 have at least one inflection point.

The third lens element 430 with negative refractive power has an object-side surface 431 being convex in a paraxial region thereof and an image-side surface 432 being concave in a paraxial region thereof, which are both aspheric, and the third lens element 430 is made of plastic material. Moreover, the image-side surface 432 of the third lens element 430 has at least one convex shape in an off-axis region thereof.

The IR-cut filter 450 is made of glass and located between the third lens element 430 and the image plane 440, and will not affect the focal length of the imaging lens assembly.

The detailed optical data of the 4th embodiment are shown in Table 7 and the aspheric surface data are shown in Table 8 below.

TABLE 7

4th Embodiment
f = 3.80 mm, Fno = 3.00, HFOV = 37.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.329 | ASP | 0.658 | Plastic | 1.650 | 21.4 | 3.53 |
| 2 | | −6.785 | ASP | −0.015 | | | | |
| 3 | Ape. Stop | Plano | | 0.493 | | | | |
| 4 | Lens 2 | −1.816 | ASP | 0.546 | Plastic | 1.530 | 55.8 | −75.99 |
| 5 | | −2.100 | ASP | 0.475 | | | | |
| 6 | Lens 3 | 2.105 | ASP | 0.704 | Plastic | 1.543 | 56.5 | −30.13 |
| 7 | | 1.646 | ASP | 0.700 | | | | |
| 8 | IR-cut filter | Plano | | 0.300 | Glass | 1.517 | 64.2 | — |
| 9 | | Plano | | 0.901 | | | | |
| 10 | Image | Plano | | — | | | | |

Note:
Reference wavelength is 587.6 nm (d-line).

TABLE 8

Aspheric Coefficients

| | Surface # | | |
|---|---|---|---|
| | 1 | 2 | 4 |
| k = | −1.9922E+01 | 5.4639E+01 | −2.5394E+00 |
| A4 = | −1.2417E−02 | −7.1575E−03 | 7.5708E−03 |
| A6 = | 4.8839E−02 | −7.2736E−02 | 1.6981E−01 |
| A8 = | −1.4891E−01 | 1.3082E−01 | 1.7644E−01 |
| A10 = | −2.3934E−02 | 1.7462E−02 | −1.7344E−01 |
| A12 = | 1.6599E−01 | −6.7181E−01 | 2.2840E−02 |
| A14 = | 1.7588E−01 | −8.7162E−01 | −1.1108E−04 |
| A16 = | −2.2989E−01 | 7.9056E+00 | −4.1091E−04 |

| | Surface # | | |
|---|---|---|---|
| | 5 | 6 | 7 |
| k = | 1.0249E−01 | −1.3953E+01 | −6.4333E+00 |
| A4 = | −4.9608E−02 | −1.3838E−01 | −8.7411E−02 |
| A6 = | 1.3768E−01 | 1.3257E−02 | 1.7557E−02 |
| A8 = | 1.0357E−01 | −1.3457E−03 | −3.5476E−03 |
| A10 = | −3.2432E−02 | 3.7548E−04 | 6.5842E−05 |
| A12 = | 2.4112E−04 | 1.3931E−04 | 8.6659E−06 |
| A14 = | −1.1497E−03 | −6.4167E−05 | 6.6405E−06 |
| A16 = | −5.5455E−03 | 1.4464E−04 | −2.0273E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following relationships:

| 4th Embodiment | | | |
|---|---|---|---|
| f [mm] | 3.80 | (R1 + R2)/(R1 − R2) | −0.34 |
| Fno | 3.00 | |f1/f2| | 0.05 |
| HFOV [deg.] | 37.1 | f/f3 | −0.13 |
| (V1 + V2)/(V1 − V2) | −2.24 | Σ|f/fx| | 1.25 |
| T12/T23 | 1.01 | SL/TTL | 0.86 |

5th Embodiment

Figure 9:
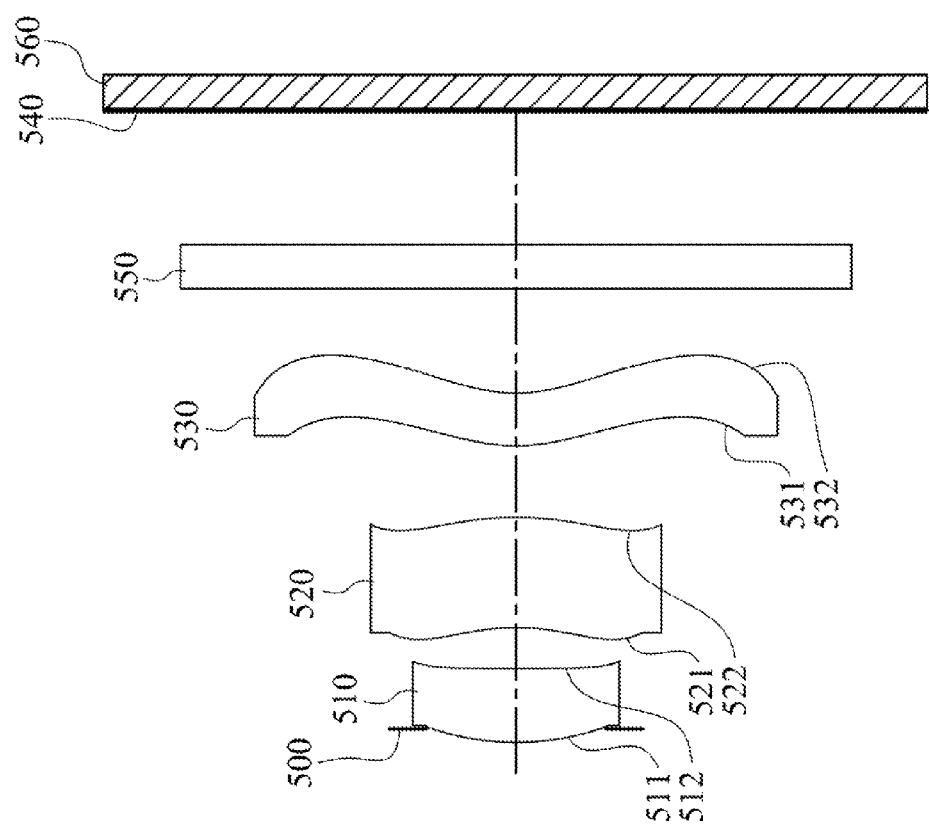
FIG. 9 is a schematic view of an imaging lens assembly according to the 5th embodiment of the present disclosure.
Figure 10:
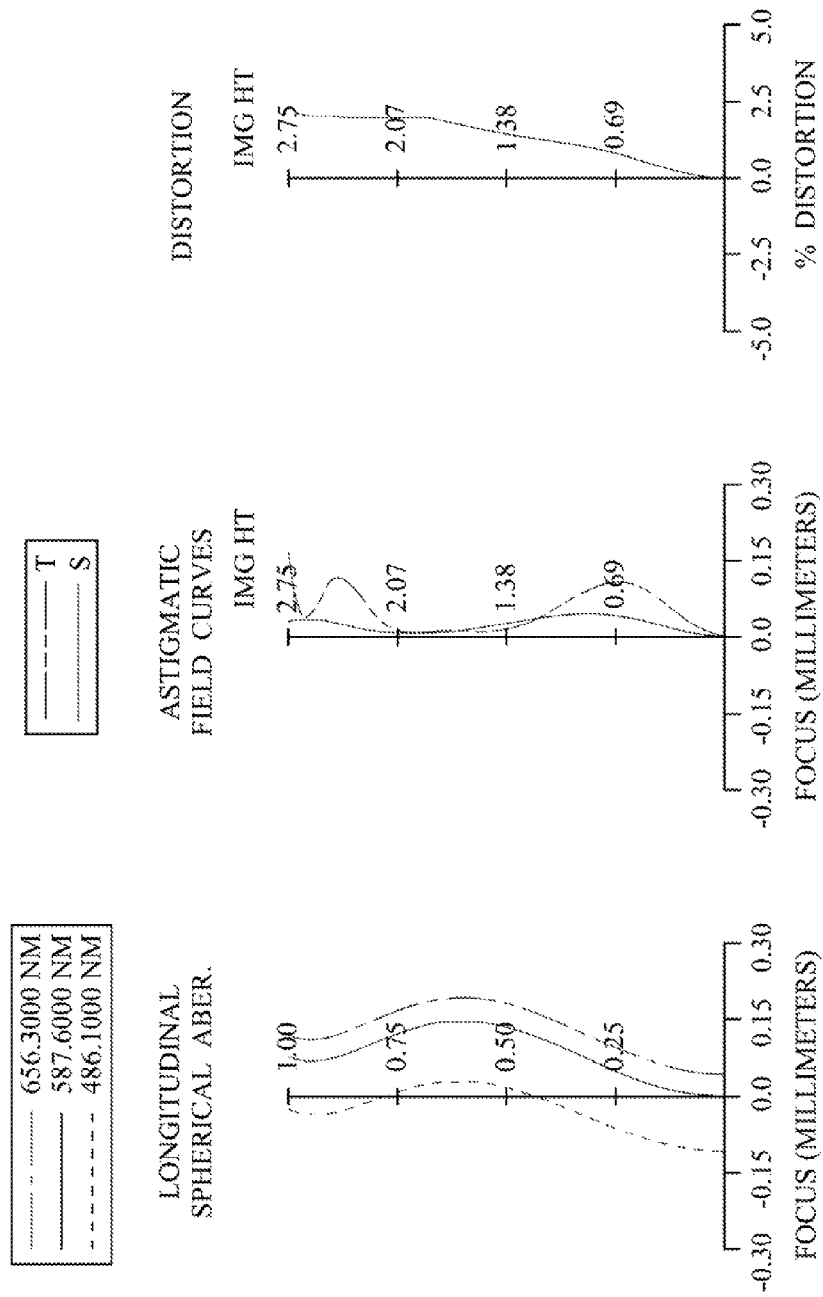
FIG. 10 shows, in order from left to right, spherical aberration curves, astigmatic field curves and a distortion curve of the imaging lens assembly according to the 5th embodiment.

FIG. 9 is a schematic view of an imaging lens assembly according to the 5th embodiment of the present disclosure. FIG. 10 shows, in order from left to right, spherical aberration curves, astigmatic field curves and a distortion curve of the imaging lens assembly according to the 5th embodiment.

In FIG. 9, the imaging lens assembly includes, in order from an object side to an image side, an aperture stop 500, a first lens element 510, a second lens element 520, a third lens element 530, an IR-cut filter 550, an image plane 540 and an image sensor 560, wherein the imaging lens assembly has a total of three lens elements (510-530) with refractive power.

The first lens element 510 with positive refractive power has an object-side surface 511 being convex in a paraxial region thereof and an image-side surface 512 being concave in a paraxial region thereof, which are both aspheric, and the first lens element 510 is made of plastic material.

The second lens element 520 with negative refractive power has an object-side surface 521 being concave in a paraxial region thereof and an image-side surface 522 being convex in a paraxial region thereof, which are both aspheric, and the second lens element 520 is made of plastic material. Moreover, both of the object-side surface 521 and the image-side surface 522 of the second lens element 520 have at least one inflection point.

The third lens element 530 with negative refractive power has an object-side surface 531 being convex in a paraxial region thereof and an image-side surface 532 being concave in a paraxial region thereof, which are both aspheric, and the third lens element 530 is made of plastic material. Moreover, the image-side surface 532 of the third lens element 530 has at least one convex shape in an off-axis region thereof.

The IR-cut filter 550 is made of glass and located between the third lens element 530 and the image plane 540, and will not affect the focal length of the imaging lens assembly.

The detailed optical data of the 5th embodiment are shown in Table 9 and the aspheric surface data are shown in Table 10 below.

TABLE 9

5th Embodiment
f = 3.42 mm, Fno = 2.85, HFOV = 37.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.091 | | | | |
| 2 | Lens 1 | 1.797 ASP | 0.495 | Plastic | 1.639 | 23.5 | 2.85 |
| 3 | | 121.155 ASP | 0.274 | | | | |
| 4 | Lens 2 | −1.511 ASP | 0.740 | Plastic | 1.543 | 56.5 | −19.13 |
| 5 | | −2.072 ASP | 0.480 | | | | |
| 6 | Lens 3 | 1.165 ASP | 0.350 | Plastic | 1.543 | 56.5 | −136.81 |
| 7 | | 1.025 ASP | 0.700 | | | | |
| 8 | IR-cut filter | Plano | 0.300 | Glass | 1.517 | 64.2 | — |
| 9 | | Plano | 0.900 | | | | |
| 10 | Image | Plano | — | | | | |

Note:
Reference wavelength is 587.6 nm (d-line).

TABLE 10

Aspheric Coefficients

| | Surface # | | |
|---|---|---|---|
| | 2 | 3 | 4 |
| k = | −3.0051E+00 | 9.0000E+01 | −4.1473E+00 |
| A4 = | 2.2596E−02 | 5.8859E−02 | 9.3830E−02 |
| A6 = | 1.8621E−01 | 9.9507E−02 | 3.4400E−01 |
| A8 = | −3.2833E−02 | 4.7745E−01 | 1.4288E−01 |
| A10 = | −1.9254E−01 | −1.7538E−01 | −2.6382E−01 |
| A12 = | −7.8767E−06 | −3.6786E−06 | −4.3870E−03 |
| A14 = | −2.3377E−06 | −2.3466E−06 | −2.3206E−06 |
| A16 = | −1.4925E−06 | −1.4948E−06 | −1.4681E−06 |

| | Surface # | | |
|---|---|---|---|
| | 5 | 6 | 7 |
| k = | −4.6998E+00 | −7.3134E+00 | −5.2678E+00 |
| A4 = | 6.2418E−03 | −7.1067E−02 | −8.0669E−02 |
| A6 = | 1.6494E−01 | 1.9760E−03 | 1.8658E−02 |
| A8 = | 7.5685E−02 | 1.0315E−03 | −3.9675E−03 |
| A10 = | −7.5728E−02 | 1.3099E−03 | −8.1684E−04 |
| A12 = | −3.8191E−02 | −5.2365E−04 | 1.7712E−04 |
| A14 = | −9.3379E−03 | −5.8428E−04 | 1.3042E−04 |
| A16 = | 4.7670E−02 | 1.8564E−04 | −4.4419E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following relationships:

| 5th Embodiment | | | |
|---|---|---|---|
| f [mm] | 3.42 | (R1 + R2)/(R1 − R2) | −1.03 |
| Fno | 2.85 | |f1/f2| | 0.15 |
| HFOV [deg.] | 37.9 | f/f3 | −0.03 |
| (V1 + V2)/(V1 − V2) | −2.42 | Σ|f/fx| | 1.40 |
| T12/T23 | 0.57 | SL/TTL | 0.98 |

6th Embodiment

Figure 11:
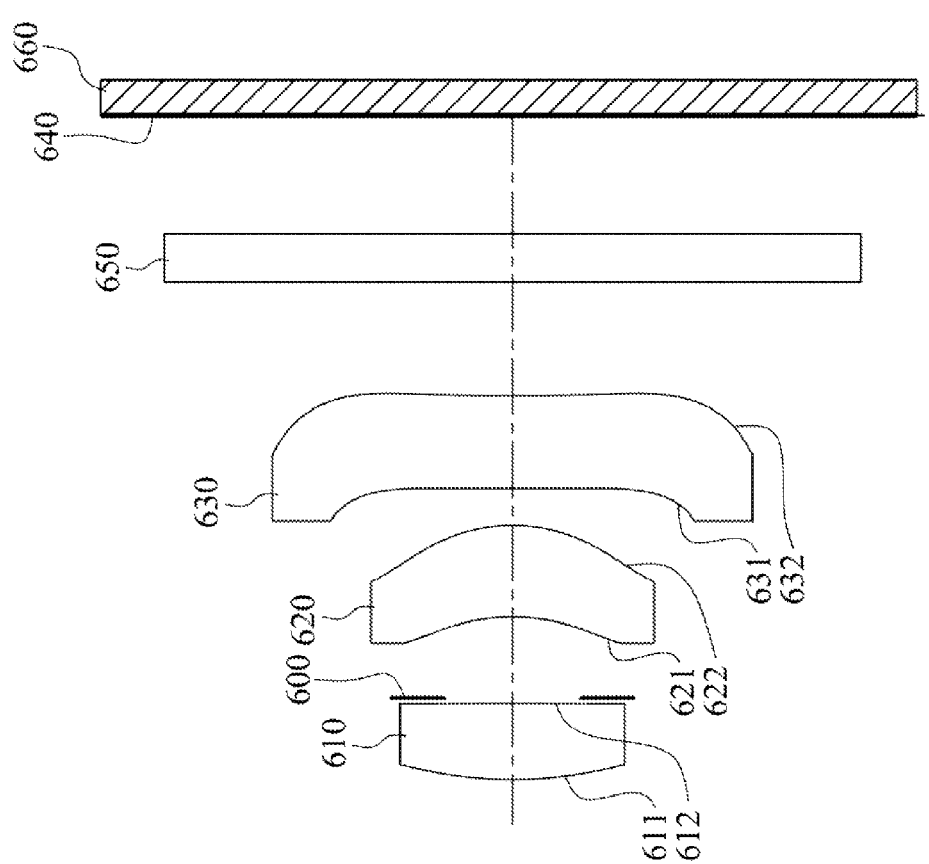
FIG. 11 is a schematic view of an imaging lens assembly according to the 6th embodiment of the present disclosure.
Figure 12:
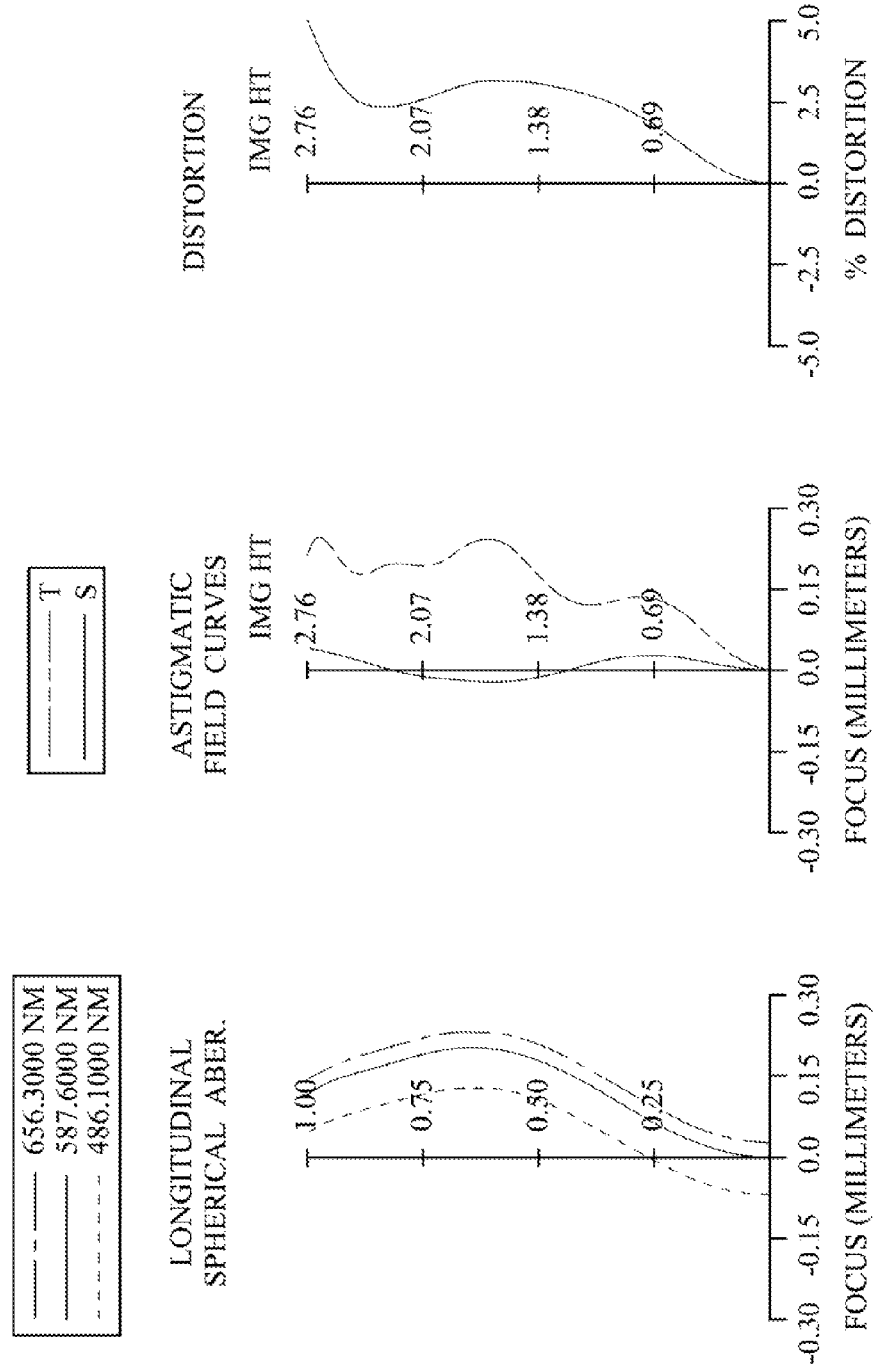
FIG. 12 shows, in order from left to right, spherical aberration curves, astigmatic field curves and a distortion curve of the imaging lens assembly according to the 6th embodiment.

FIG. 11 is a schematic view of an imaging lens assembly according to the 6th embodiment of the present disclosure. FIG. 12 shows, in order from left to right, spherical aberration curves, astigmatic field curves and a distortion curve of the imaging lens assembly according to the 6th embodiment.

In FIG. 11, the imaging lens assembly includes, in order from an object side to an image side, a first lens element 610, an aperture stop 600, a second lens element 620, a third lens element 630, an IR-cut filter 650, an image plane 640 and an image sensor 660, wherein the imaging lens assembly has a total of three lens elements (610-630) with refractive power.

The first lens element 610 with positive refractive power has an object-side surface 611 being convex in a paraxial region thereof and an image-side surface 612 being convex in a paraxial region thereof, which are both aspheric and the first lens element 610 is made of plastic material.

The second lens element 620 with positive refractive power has an object-side surface 621 being concave in a paraxial region thereof and an image-side surface 622 being convex in a paraxial region thereof, which are both aspheric, and the second lens element 620 is made of plastic material.

The third lens element 630 with negative refractive power has an object-side surface 631 being concave in a paraxial region thereof and an image-side surface 632 being concave in a paraxial region thereof, which are both aspheric, and the third lens element 630 is made of plastic material. Moreover, the image-side surface 632 of the third lens element 630 has at least one convex shape in an off-axis region thereof.

The IR-cut filter 650 is made of glass and located between the third lens element 630 and the image plane 640, and will not affect the focal length of the imaging lens assembly.

The detailed optical data of the 6th embodiment are shown in Table 11 and the aspheric surface data are shown in Table 12 below.

TABLE 11

6th Embodiment
f = 2.94 mm, Fno = 2.95, HFOV = 41.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.684 | ASP | 0.520 | Plastic | 1.633 | 23.4 | 3.98 |
| 2 | | −37.200 | ASP | 0.035 | | | | |
| 3 | Ape. Stop | Plano | | 0.546 | | | | |
| 4 | Lens 2 | −1.467 | ASP | 0.623 | Plastic | 1.530 | 55.8 | 5.34 |
| 5 | | −1.108 | ASP | 0.247 | | | | |
| 6 | Lens 3 | −100.000 | ASP | 0.628 | Plastic | 1.543 | 56.5 | −75.08 |
| 7 | | 69.061 | ASP | 0.770 | | | | |
| 8 | IR-cut fliter | Plano | | 0.330 | Glass | 1.517 | 64.2 | — |
| 9 | | Plano | | 0.800 | | | | |
| 10 | Image | Plano | | — | | | | |

Note:
Reference wavelength is 587.6 nm (d-line).

TABLE 12

Aspheric Coefficients

| | Surface # | | |
|---|---|---|---|
| | 1 | 2 | 4 |
| k = | −1.8497E+01 | −9.0000E+01 | 4.0610E−01 |
| A4 = | 5.2975E−02 | 1.4871E−01 | −1.6938E−01 |
| A6 = | 1.0992E−01 | −1.2147E+00 | 4.3158E−01 |
| A8 = | −2.6978E−01 | 3.2567E+00 | 3.9655E−01 |
| A10 = | 9.1571E−03 | −4.9744E−01 | −5.1112E−01 |
| A12 = | 7.7993E−02 | −2.0319E+00 | 8.0052E−03 |
| A14 = | 6.8894E−01 | −4.8005E+00 | −3.2178E−05 |
| A16 = | −7.8371E−01 | −4.0960E+01 | −9.8368E−05 |

| | Surface # | | |
|---|---|---|---|
| | 5 | 6 | 7 |
| k = | 4.6024E−02 | 9.0000E+01 | −3.5029E+01 |
| A4 = | 5.0599E−02 | 1.8474E−02 | 9.4152E−02 |
| A6 = | −5.1487E−03 | 1.4190E−01 | −1.3921E−01 |
| A8 = | 1.2162E−01 | −6.9049E−01 | 5.5464E−02 |
| A10 = | 9.3797E−02 | 9.4075E−01 | −7.9233E−03 |
| A12 = | 8.4510E−05 | −6.3236E−01 | −1.0842E−03 |
| A14 = | −3.3301E−04 | 2.0663E−01 | 1.7593E−04 |
| A16 = | −1.3275E−03 | −2.7206E−02 | 6.6956E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following relationships:

| 6th Embodiment | | | |
|---|---|---|---|
| f [mm] | 2.94 | (R1 + R2)/(R1 − R2) | −0.87 |
| Fno | 2.95 | |f1/f2| | 0.75 |
| HFOV [deg.] | 41.0 | f/f3 | −0.04 |
| (V1 + V2)/(V1 − V2) | −2.44 | Σ|f/fx| | 1.33 |
| T12/T23 | 2.35 | SL/TTL | 0.87 |

The foregoing description, for purpose of explanation, has been described with reference to specific embodiments. It is to be noted that TABLES 1-12 show different data of the different embodiments; however, the data of the different embodiments are obtained from experiments. The embodiments were chosen and deserted in order to best explain the principles of the practical applications, to thereby enable others skilled in the art to best utilize the present disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly comprising, in order from an object side to an image side:
   a first lens element with positive refractive power having an object-side surface being convex in a paraxial region thereof;
   a second lens element with refractive power having an object-side surface being concave in a paraxial region thereof and an image-side surface being convex in a paraxial region thereof; and
   a third lens element with refractive power having an image-side surface being concave in a paraxial region thereof, wherein an object-side surface and the image-side surface of the third lens element are aspheric, and the image-side surface of the third lens element has at least a convex shape in an off-axis region thereof;
   wherein the imaging lens assembly has a total of three lens elements with refractive power, an Abbe number of the first lens element is V1, an Abbe number of the second lens element is V2, a focal length of the first lens element is f1, a focal length of the second lens element is f2, an axial distance between the first lens element and the second lens element is T12, an axial distance between the second lens element and the third lens element is T23, and the following relationships are satisfied:

$-4.0 < (V1+V2)/(V1-V2) < -1.5;$ $0 < |f1/f2| < 0.9;$ and $0 < T12/T23 \leq 3.0.$ 2. The imaging lens assembly of claim 1, further comprising:
   a stop disposed between an imaged object and the first lens element, wherein an axial distance between the stop and an image plane is SL, an axial distance between the object-side surface of the first lens element and the image plane is TTL, and the following relationship is satisfied:

$$0.90 < SL/TTL < 1.10.$$

3. The imaging lens assembly of claim 2, wherein the object-side surface of the third lens element is convex in a paraxial region thereof.

4. The imaging lens assembly of claim 3, wherein the first lens element has an image-side surface being concave in a paraxial region thereof.

5. The imaging lens assembly of claim 3, wherein the Abbe number of the first lens element is V1, the Abbe number of the second lens element is V2, and the following relationship is satisfied:

$$-3.0 < (V1+V2)/(V1-V2) < -1.5.$$

6. The imaging lens assembly of claim 3, wherein the focal length of the first lens element is f1, the focal length of, the second lens element is f2, and the following relationship is satisfied:

$$0.1 < |f1/f2| < 0.5.$$

7. The imaging lens assembly of claim 3, wherein a focal length of the imaging lens assembly is f, the focal length of the first lens element is f1, the focal length of the second lens element is f2, a focal length of the third lens element is f3, and the following relationship is satisfied:

$$1.0 < \Sigma |f/fx| < 2.0;$$

where x=1, 2, and 3.

8. The imaging lens assembly of claim 1, wherein a curvature radius of the object-side surface of the first lens element is R1, a curvature radius of an image-side surface of the first lens element is R2, and the following relationship is satisfied:

$$-4.0 < (R1+R2)/(R1-R2) < 0.$$

9. The imaging lens assembly of claim 8, wherein the second lens element has negative refractive power.

10. The imaging lens assembly of claim 8, wherein the third lens element has negative refractive power, a focal length of the imaging lens assembly is f, a focal length of the third lens element is f3, and the following relationship is satisfied:

$$-0.25 < f/f3 < 0.$$

11. The imaging lens assembly of claim 1, wherein both of the object-side surface and the image-side surface of the second lens element are aspheric and at least one of the object-side surface and the image-side surface of the second lens element has at least one inflection point.

12. An image capturing device, comprising the imaging lens assembly as set forth herein in claim 1 and an image sensor located on an image plane side of the imaging lens assembly.

13. An imaging lens assembly comprising, in order from an object side to an image side:
a first lens element with positive refractive power having an object-side surface being convex in a paraxial region thereof;
a second lens element with refractive power having an object-side surface being concave in a paraxial region thereof and an image-side surface being convex in a paraxial region thereof; and
a third lens element with refractive power having an image-side surface being concave in a paraxial region thereof,
wherein both of an object-side surface and the mage-side surface of the third lens element are aspheric, and the image-side surface of the third lens element has at least a convex shape in an off-axis region thereof;
wherein the imaging lens assembly has a total of three lens elements with refractive power and further comprises a stop located between an imaged object and the first lens element, an Abbe number of the first lens element is V1, an Abbe number of the second lens element is V2, an axial distance between the first lens element and the second lens element is T12, an axial distance between the second lens element and the third lens element is T23, a focal length of the first lens element is f1, a focal length of the second lens element is f2, an axial distance between the stop and an image plane is SL, an axial distance between the object-side surface of the first lens element and the image plane is TTL, and the following relationships are satisfied:

$$-4.0 < (V1+V2)/(V1-V2) < -1.5;$$

$$0 < T12/T23 < 4.5;$$

$$0 < |f1/f2| < 0.9; \text{ and}$$

$$0.90 < SL/TTL < 1.10.$$

14. The imaging lens assembly of claim 13, wherein the focal length of the first lens element is f1, the focal length of the second lens element is f2, and the following relationship is satisfied:

$$0 < |f1/f2| < 0.5.$$

15. The imaging lens assembly of claim 14, wherein the axial distance between the first lens element and the second lens element is T12, the axial distance between the second lens element and the third lens element is T23, and the following relationship is satisfied:

$$0 < T12/T23 < 3.5.$$

16. The imaging lens assembly of claim 14, wherein the second lens element has negative refractive power.

17. The imaging lens assembly of claim 14, wherein a focal length of the imaging lens assembly is f, the focal length of the first lens element is f1, the focal length of the second lens element is f2, a focal length of the third lens element is f3, and the following relationship is satisfied:

$$1.0 < \Sigma |f/fx| < 2.0;$$

where x=1, 2, and 3.

18. The imaging lens assembly of claim 14, wherein the Abbe number of the first lens element is V1, the Abbe number of the second lens element is V2, and the following relationship is satisfied:

$$-3.0 < (V1+V2)/(V1-V2) < -1.5.$$

19. The imaging lens assembly of claim 14, wherein the first lens element has an image-side surface being concave in a paraxial region thereof.

20. The imaging lens assembly of claim 13, wherein the third lens element has negative refractive power, a focal length of the imaging lens assembly is f, a focal length of the third lens element is f3, and the following relationship is satisfied:

$$-0.25 < f/f3 < 0.$$

* * * * *